(12) United States Patent
Takagi et al.

(10) Patent No.: US 7,473,727 B2
(45) Date of Patent: Jan. 6, 2009

(54) FRICTION MATERIAL FOR TRANSMISSION

(75) Inventors: Yoshiaki Takagi, Toyama (JP); Eishin Matsui, Toyama (JP); Yoshihiro Fukushima, Toyama (JP); Tomoya Takata, Toyama (JP)

(73) Assignee: Tanaka Seimitsu Kogyo Co., Ltd., Toyoma (JP)

( * ) Notice: Subject to any disclaimer, the term of this patent is extended or adjusted under 35 U.S.C. 154(b) by 336 days.

(21) Appl. No.: 10/558,932

(22) PCT Filed: Jun. 3, 2004

(86) PCT No.: PCT/JP2004/007701

§ 371 (c)(1), (2), (4) Date: Jan. 19, 2006

(87) PCT Pub. No.: WO2004/109138

PCT Pub. Date: Dec. 16, 2004

(65) Prior Publication Data

US 2006/0257647 A1 Nov. 16, 2006

(30) Foreign Application Priority Data

Jun. 4, 2003 (JP) .............................. 2003-159549

(51) Int. Cl.
*C08K 3/04* (2006.01)
*B32B 5/16* (2006.01)
*H01B 1/00* (2006.01)

(52) U.S. Cl. ...................... 524/424; 524/495; 524/498; 523/149; 523/152; 523/155; 428/326; 252/500

(58) Field of Classification Search ................. 252/500; 428/326; 523/149, 152, 155; 524/424, 495, 524/498
See application file for complete search history.

(56) References Cited

U.S. PATENT DOCUMENTS 5,428,081 A 6/1995 Song
6,524,681 B1 * 2/2003 Seitz et al. .................. 428/143

FOREIGN PATENT DOCUMENTS

| JP | 47-48081 | 12/1972 |
| JP | 5-32955 | 2/1993 |
| JP | 6-145648 | 5/1994 |
| JP | 9-221553 | 8/1997 |
| JP | 10-8034 | 1/1998 |
| JP | 2000-509467 | 7/2000 |
| JP | 2000-345141 | 12/2000 |
| WO | 97/38236 | 10/1997 |

\* cited by examiner

*Primary Examiner*—Kriellion A Sanders
(74) *Attorney, Agent, or Firm*—Wenderoth, Lind & Ponack, L.L.P.

(57) ABSTRACT

A friction material for a synchronizer ring comprises (A) a petroleum coke with an ash content of 0.1 mass % to 8 mass % or (B) a pitch coke with an ash content of 0.1 mass % to 8 mass %, more preferably (C) a calcined petroleum coke with an ash content of 0.1 mass % to 1 mass % or (D) a foundry coke with an ash content of 5 mass % to 8 mass %. The friction material is effectively used for a synchronizer ring requiring high coefficient of dynamic friction.

11 Claims, 4 Drawing Sheets

FRICTION MATERIAL FOR TRANSMISSION

This application is a U.S. national stage of International Application No. PCT/JP2004/007701 filed Jun. 3, 2004.

TECHNICAL FIELD

The present invention relates to a friction material for transmission, and particularly to a friction material that can effectively be used for a synchronizer ring requiring high coefficient of dynamic friction.

BACKGROUND ART

A typical synchronizer ring, which has conventionally been used in a synchromesh type of gear reducer (hereinafter referred to as "transmission") for automobiles, is an annular sliding friction part for allowing two gears to smoothly engage with each other and to rotate synchronously by sliding at the time of gear change in a transmission of automobiles.

Such synchronizer ring is generally made of brass (a Cu—Zn alloy). Its inner surface to be in contact with the gear cone has annular streak grooves for giving friction force and vertical grooves for releasing lubricating oil, as needed.

It is also known that a material with high melting point such as molybdenum and ceramics is thermally sprayed on the inner surface to form a sprayed coating layer, which is fixed onto the body of the synchronizer ring.

There is also a known method for improving its friction characteristics, which includes the step of fixing, onto its inner surface, a layer of a friction material that contains a resin agent as a binder, a carbon material, a thermosetting resin, a metallic material, an inorganic material, and the like. For example, such a method is disclosed in Japanese Patent Application Laid-Open (JP-A) Nos. 57-195923, 59-187114, 09-79288, 09-221553, and 11-61103. In the disclosures, the carbon material includes wood powder, cotton and graphite. The above disclosures are, however, completely silent on the use of petroleum coke or pitch coke of the present invention as well as general cokes. JP-A-05-32955 discloses a wet friction material consisting of 10 to 30% by weight of graphite powder, 3 to 15% by weight of coke powder having a porosity of 10 to 20%, and the remaining part of a calcined powder composed mainly of copper. However, this reference does not describe anything about not only cokes with low ash content but also wet friction materials using a thermosetting resin. High performance engines or transmissions developed in recent years are requiring high coefficient of dynamic friction of the synchronizer ring for not only their reliable operation but also for good shift feeling in the operation. Of course, since the synchronizer ring is a sliding friction part, high resistance to abrasion and seizing is required. In the operation of such a high performance engine, an inadvertent shift of the shift lever without sufficient depression of the clutch pedal or a mistaken up- or down-shift can cause the synchronizer ring to generate a greater frictional heat than that in the conventional case and thus greater heat load. Therefore, the synchronizer ring should have higher resistance to abrasion and seizing.

For the purpose of increasing the frictional force, for example, the pressing force of the synchronizer ring may be mechanically increased, or the shape of the inner surface may be changed for higher contact pressure. In such a case, however, the brass synchronizer ring can generate a relatively great heat load when brought into contact with the counterpart gear cone, so that its synchronization performance can be reduced by the action of frictional heat.

Against such technical problem, there is a method for increasing the capacity for absorbing the frictional heat and improving the synchronization performance, which includes providing two, three or more frictional surfaces for the brass synchronizer ring to form a multi-cone type synchronizer ring. Such method, however, would increase the number of parts for the synchronizer ring and can lead to higher cost thereof and larger transmission size responsible for an increase in the weight of the vehicle.

It is also known that the method of thermally spraying the refractory material such as molybdenum on the inner surface can produce an abrasion or seizing resistance for withstanding the frictional heat but cannot produce high coefficient of dynamic friction at the same time.

Against such a technical problem, for example, Japanese Patent No. 2992373 discloses a technique of compounding and dispersing a hard ceramic into molybdenum or the like, followed by thermal spraying. Concerns remain, however, that the scratching action of the ceramic at the time of frictional sliding can cause significant abrasion of the sliding surface of the gear cone, which is generally made of steel, so that the synchronization performance or function can be reduced or degraded.

Any friction material containing the binder of the resin agent as disclosed in the above patent publications has an improved coefficient of dynamic friction, an improved resistance to abrasion or seizing, or an improved friction coefficient at a relative velocity of near-zero rpm (coefficient of static friction), compared with the brass for the conventional brass synchronizer ring. Such a material, however, is not necessarily satisfactory, and a further improvement in performance has been desired.

Thus, there has been a demand for development of a friction material for a synchronizer ring so as to form a good friction material layer on the inner surface of the synchronizer ring. The present invention has been made intensively to solve the above problem.

DISCLOSURE OF THE INVENTION

The inventors have made active investigations in order to solve the above problem. In particular, the inventors of the present invention have prepared friction materials by trial and error using a variety of carbon material samples and have aggressively made performance tests on the prepared materials. In the tests, the selected carbon materials include wood powder, cotton, spherical graphite powder, natural flake graphite powder, artificial graphite powder, activated carbon, coal, wood charcoal, bamboo charcoal, carbon fibers, diamond, cokes, and the like. As a result of the tests, it has been found that wood powder, cotton, wood charcoal, bamboo charcoal, or activated carbon is too soft and not useful enough to be used; diamond is too hard and not useful enough to be used; all the graphite materials and carbon fibers are not useful enough to be used because their structure causes lubricating characteristics; and cokes provide relatively high coefficients of dynamic friction and relatively high resistance to abrasion and seizing. The inventors have further made investigations on the cokes and found that petroleum or pitch cokes with an ash content of 0.1 mass % to 8 mass % are particularly appropriate for the above-mentioned object of the invention. The inventors of the present invention have also found that more preferred petroleum or pitch cokes are calcined petroleum cokes with an ash content of 0.1 mass % to 1 mass % or foundry cokes with an ash content of 5 mass % to 8 mass %, and that a calcined petroleum or foundry coke of not less than 50 mass % having a particle diameter of 0.1 to 0.5 mm, is most preferred.

Based on these findings, the inventors have further made investigations to complete the invention.

Thus, the invention is directed to:

(1) a friction material for a synchronizer ring, comprising (A) a petroleum coke with an ash content of 0.1 mass % to 8 mass % or (B) a pitch coke with an ash content of 0.1 mass % to 8 mass %, (2) the friction material for a synchronizer ring according to the above (1), wherein the petroleum coke is (C) a calcined petroleum coke with an ash content of 0.1 mass % to 1 mass %, (3) the friction material for a synchronizer ring according to the above (1), wherein the pitch coke is (D) a foundry coke with an ash content of 5 mass % to 8 mass %;

(4) the friction material for a synchronizer ring according to any one of the above (1) to (3), wherein not less than 50 mass % of the particles of the petroleum coke or the pitch coke has a particle diameter of 0.1 to 0.5 mm, (5) the friction material for a the synchronizer ring according to any one of the above (1) to (4), comprising 30 mass % to 80 mass % of the petroleum coke or the pitch coke in the friction material, (6) the friction material for a synchronizer ring according to any one of the above (1) to (4), comprising 50 mass % to 75 mass % of the petroleum coke or the pitch coke in the friction material, (7) the friction material for a synchronizer ring according to any one of the above (1) to (6), further comprising 10 mass % to 30 mass % of a thermosetting resin, 5 mass % to 40 mass % of inorganic fibers and/or inorganic particles.

(8) the friction material for a synchronizer ring according to any one of the above (1) to (7), further comprising not more than 5 mass % of graphite, (9) the friction material for a synchronizer ring according to any one of the above (1) to (8), further comprising not more than 10 mass % of metal fibers and/or not more than 10 mass % of metal particles,

(10) the friction material for a synchronizer ring according to any one of the above (1) to (9), wherein the thermosetting resin is a novolac type phenolic resin,

(11) a friction material for a synchronizer ring, comprising 30 mass % to 80 mass % of (C) a calcined petroleum coke with an ash content of 0.1 mass % to 1 mass % or (D) a foundry coke with an ash content of 5 mass % to 8 mass %, based on the whole materials; 10 mass % to 30 mass % of a thermosetting resin; 5 mass % to 40 mass % of inorganic fibers and/or inorganic particles; and not more than 5 mass % of graphite, wherein not less than 50 mass % of the particles of the calcined petroleum coke or the foundry coke has a particle diameter of 0.1 to 0.5 mm, and

(12) a wet friction material, comprising 30 mass % to 80 mass % of (C) a calcined petroleum coke with an ash content of 0.1 mass % to 1 mass % or (D) a foundry coke with an ash content of 5 mass % to 8 mass %, based on the whole materials; 10 mass % to 30 mass % of a thermosetting resin; 5 mass % to 40 mass % of inorganic fibers and/or inorganic particles; and not more than 5 mass % of graphite, wherein not less than 50 mass % of the particles of the calcined petroleum coke or the foundry coke has a particle diameter of 0.1 to 0.5 mm.

The terminology "wet friction material" means a friction material to be used in a liquid, especially in an oil.

BEST MODE FOR CARRYING OUT THE INVENTION

According to the present invention, the friction material for the synchronizer ring contains (A) a petroleum coke with an ash content of 0.1 mass % to 8 mass % or (B) a pitch coke with an ash content of 0.1 mass % to 8 mass %. In general, it is difficult to obtain a coke with an ash content of less than 0.1 mass %. A coke with an ash content of more than 8 mass % cannot exhibit a sufficient coefficient of dynamic friction.

The ash content may be measured according to JIS M 8511 (1976).

The petroleum coke can be obtained through a coking process. Specifically, it can be obtained as a by-product in the process of thermally converting heavy oil into light hydrocarbons (such as gas, gasoline and gas oil). The petroleum coke may be subjected to high temperature processing to produce a calcined petroleum coke. In Japan, such petroleum cokes are available from Koa Oil Co., Ltd.

In a more preferred mode, the petroleum coke is a calcined petroleum coke with an ash content of 0.1 mass % to 1 mass %.

The pitch coke can be produced by carbonization of coal. Examples of such a process include a chamber-oven method and a delayed coking method. Such methods have conventionally been established enough. Examples of the pitch coke include a foundry coke, a coke for a carbide electric furnace, a coke for lime calcination, a general-purpose coke, and a coke breeze.

In a most preferred mode, the pitch coke is a foundry coke with an ash content of 5 mass % to 8 mass %.

In a preferred mode, the petroleum or pitch coke of not less than 50 mass % has a particle diameter of 0.1 to 0.5 mm. If each of such cokes has a particle diameter of less than 0.1 mm, it is difficult to produce appropriate amounts of pores in the friction material layer so that the coefficient of dynamic friction is lowered. If such cokes each have a particle diameter of more than 0.5 mm, the friction material layer can be insufficient in strength.

The content of the petroleum or pitch coke in the friction material for the synchronizer ring is preferably from 30 mass % to 80 mass %, more preferably from 50 mass % to 75 mass %. If the content is less than 30 mass %, the coefficient of dynamic friction can be low. If the content is more than 80 mass %, the friction material layer can be insufficient in strength.

In the present invention, a thermosetting resin is preferably used. Examples of such thermosetting resins include a phenolic resin (such as a novolac type phenolic resin, an epoxy-modified phenolic resin, a melamine-modified phenolic resin, a cashew-modified phenolic resin, a cresol-modified phenolic resin, and a hydrocarbon resin-modified phenolic resin), an unsaturated polyester resin, an epoxy resin, a melamine resin, a vinyl ester resin, a polyimide resin, a silicone resin, and a diallyl phthalate resin. One of these resins may be used alone, or two or more thereof may be used in combination. Of these resins, the novolac type phenolic resin is preferred in view of heat resistance and cost.

The content of the thermosetting resin in the whole of the friction material is preferably from 10 mass % to 30 mass %. If the content is less than 10 mass %, its binding force is insufficient so that the yield can be low. If the content is more than 30 mass %, the brittleness of the thermosetting resin itself easily leads to insufficient strength and results in a reduction in coefficient of dynamic friction.

In the present invention, inorganic fibers and/or inorganic particles are preferably used. For example, such fibers and/or particles may be made of alumina, silicon carbide, glass, rock wool, zeolite, vermiculite, wollastonite, or calcium carbonate. The content of the inorganic fibers and/or the inorganic particles in the whole of the friction material is preferably from 5 mass % to 40 mass %. If the content is less than 5 mass %, the friction material is insufficient in strength. If the content is more than 40 mass %, the whole of the friction material can lack plasticity so that it easily makes scratches on the sliding surface of gears.

In the present invention, graphite may also be used. Examples of graphite include spherical graphite powder, natural flake graphite powder and artificial graphite powder, but graphite is not an essential component. If used, a small amount of graphite may be enough, and generally, the content of graphite in the whole of the friction material may be not more than 5 mass %. The addition of the graphite can sometimes improve abrasive resistance.

In the present invention, metal fibers and/or metal particles may also be used. Examples of the metal materials include aluminum, an aluminum alloy, copper, and a copper alloy (brass). The content of the metal fibers and/or the metal particles in the friction material should be not more than 10 mass %. The metal fibers and/or the metal particles can sometimes improve the durability of the thermosetting resin but are not always necessary.

In the present invention, organic fibers and/or organic particles may also be used. Examples of the organic fibers and/or organic particles include cashew dust, walnut powder, melamine powder, aramid fiber, Dyneema fiber, Vectran fiber, Kevlar fiber, and fluorofiber. They may take a form of chops or a pulp. The content of the organic fibers and/or the organic particles in the whole of the friction material should be not more than 15 mass %. The organic fibers and/or the organic particles can improve the coefficient of dynamic friction.

The friction material of the present invention may be produced by a process of mixing the above raw materials. The present invention is described in detail in the preferred embodiments below, which are not intended to limit the scope of the present invention.

EXAMPLES

Preferred embodiments of the present invention are described in the examples below with reference to the attached drawings.

FIG. 1 is an axial sectional view showing the main body of the synchronizer ring having a layer of the friction material for the synchronizer ring on the inner surface of the annular structure. FIG. 2 is a flowchart showing a process of forming, on the inner surface of the annular structure, a friction material layer from the friction material for the synchronizer ring of the present invention. FIG. 3 is a schematic diagram showing a process of pre-molding the friction material for the synchronizer ring on the inner surface of the annular structure after the introduction of the friction material. FIG. 4 is a schematic diagram showing a calcination process for forming a friction material layer integrated with the inner surface of the annular structure after the pre-molding.

Referring to FIG. 1, for example, a synchronizer ring 10 using the friction material for the synchronizer ring of the present invention comprises an annular structure 11 and a friction material layer 12 made of the inventive friction material and formed on the inner surface of the annular structure 11. The thickness of the friction material layer 12 can be customized to the user's need by machining or the like. Even a thickness (film thickness) of about 0.5 mm can ensure sufficient resistance to abrasion under practical load conditions, and thus the degree of freedom of thickness setting is relatively high.

Referring to FIGS. 2 to 4, a method of manufacturing the synchronizer ring 10 is described below.

After the inner surface of the annular structure 11, which is previously subjected to ground treatment or surface treatment by blasting or the like, is washed with alcohol or the like, a thermosetting adhesive such as a phenolic resin and an epoxy resin is applied to the inner surface. The annular structure 11 is then placed in a thermostatic chamber or the like and kept under the atmosphere at a temperature of 70 to 120° C. for 10 to 30 minutes so that the adhesive is dried. The annular structure 11 is then placed in a lower die 22 of molding dies 20. Thereafter, a friction material 16 is introduced and packed into the cavity formed between the inner surface of the annular structure 11 and the outer surface of a core 23. In a conventional oil hydraulic press machine or the like, the friction material 16 is compressed by means of a punch 21a of an upper die 21 to be pre-molded at a die temperature within the range from normal temperature to 50° C. The molding dies 20 are then placed on a heating platen preset at a temperature of 180 to 300° C. in a conventional straight hydraulic molding machine, and the material is calcined (heated and press-molded) for 5 to 30 minutes to form a friction material layer 13 integrated with the annular structure 11. Finally, the inside edge of the friction material layer 13 is cut in a tapered shape (a cone shape), for example, by machining, and then annular streak grooves 14 in the circumferential direction and vertical grooves 15 in the radial direction are formed, so that the friction material layer 12 is completed.

Some tests are done on the synchronizer ring 10 having the friction material layer 12 using the inventive friction material for the synchronizer ring. The results of the respective tests are described below.

Tables 1 and 2 show the results of a synchronization unit performance test, which is performed as follows. In a synchronization unit test machine, the inertial weight is set at 85 kgf·cm$^2$, and each synchronizer ring 10 is placed in a transmission oil (oil kind: Honda MTF-II) at 65° C. and undergoes 1000 cycles of press by a pressing force of 25 kgf with an air cylinder against a tapered counterpart member (name: gear cone, material: SCM420, heat treatment: carburizing, quenching and tempering, tapered face: processed by grinding) rotating at a rotational speed of 1300 rpm; Thereafter, each synchronizer ring 10 undergoes 30 cycles of press with the air cylinder against the counterpart member by each of the pressing forces 25 kgf, 40 kgf and 75 kgf, when a coefficient of dynamic friction (an average coefficient of dynamic friction during a synchronization time) and a synchronization time (the time period from synchronization start to synchronization end in one cycle) are measured. All the annular structures 11 used in the test are made of the same base material of brass and are the same in shape and size. All the synchronizer rings 10 are manufactured by the above process, and all the friction material layers 12 have the same shape of the friction surface as shown in FIG. 1.

TABLE 1

| | | material content (% by mass) | | | | | |
|---|---|---|---|---|---|---|---|
| | | calcined petroleum coke ash content of 0.15% by mass particle diameter of 0.1 to 0.5 mm | foundry coke ash content of 7.5% by mass ← | pitch coke ash content of 10.5% by mass ← | novolac type phenolic resin *thermosetting resin | glass fibers *inorganic fibers 74 μm in average fiber length and 16 μm in average fiber diameter | Graphite *artificial graphite 250 μm in average particle diameter |
| inventive products | sample A | 55 | | | 15 | 25 | 5 |
| | sample B | | 55 | | 15 | 25 | 5 |
| comparative products | sample C | | | 55 | 15 | 25 | 5 |
| | brass product | conventional brass synchronizer ring | | | | | |

| | | synchronization unit performance test pressing force | | | | | |
|---|---|---|---|---|---|---|---|
| | | 25 (kgf) | | 40 (kgf) | | 75 (kgf) | |
| | | coefficient of kinetic friction | synchronization time | coefficient of kinetic friction | synchronization time | coefficient of kinetic friction | synchronization time |
| inventive products | sample A | 0.106 | 0.128 | 0.095 | 0.078 | 0.077 | 0.040 |
| | sample B | 0.099 | 0.133 | 0.093 | 0.079 | 0.076 | 0.041 |
| comparative products | sample C | 0.088 | 0.140 | 0.083 | 0.085 | 0.069 | 0.046 |
| | brass product | 0.092 | 0.139 | 0.088 | 0.085 | 0.070 | 0.044 |

Similar results were also obtained when the glass fibers are replaced with wollastonite fibers (with an average fiber length of 8 μm).

Table 1 shows the results of the test in which different coke materials are examined for superiority. Samples A and B each correspond to the friction material for the synchronizer ring according to the invention, wherein Sample A uses a calcined petroleum coke with an ash content of 0.15 mass %, and Sample B uses a foundry coke with an ash content of 7.5 mass %. Sample C for comparison uses a pitch coke with an ash content of 10.5 mass %, and a conventional synchronizer ring made of brass is also examined.

The results in Table 1 indicate that Samples A and B each have a higher coefficient of dynamic friction and provide a short synchronization time. This suggests that the friction material for the synchronizer ring of Sample A or B should be useful to form a synchronizer ring having a high synchronization performance (a high coefficient of dynamic friction and a short synchronization time). Comparison of the results on Samples A to C also suggests that the synchronization performance should tend to increase as the ash content decreases. Thus, it is determined that a calcined petroleum coke with a low ash content will be the most preferred material for the synchronizer ring friction material according to the invention.

TABLE 2

| | | material content (% by mass) | | | |
|---|---|---|---|---|---|
| | | calcined petroleum coke ash content of 0.15% by mass particle diameter of 0.1 to 0.5 mm | novolac type phenolic resin *thermosetting resin | glass fibers *inorganic fibers 74 μm in average fiber length and 16 μm in average fiber diameter | Graphite *artificial graphite 250 μm in average particle diameter |
| inventive products | sample D | 15 | 20 | 35 | 30 |
| | sample E | 25 | 20 | 35 | 20 |
| | sample F | 35 | 20 | 35 | 10 |
| | sample G | 45 | 15 | 30 | 10 |
| | sample A | 55 | 15 | 25 | 5 |
| | sample H | 65 | 10 | 20 | 5 |
| | sample I | 75 | 10 | 10 | 5 |
| comparative products | brass product | conventional brass synchronizer ring | | | |

TABLE 2-continued

| | | synchronization unit performance test pressing force | | | | | |
|---|---|---|---|---|---|---|---|
| | | 25 (kgf) | | 40 (kgf) | | 75 (kgf) | |
| | | coefficient of kinetic friction | synchronization time | coefficient of kinetic friction | synchronization time | coefficient of kinetic friction | synchronization time |
| inventive products | sample D | 0.091 | 0.139 | 0.088 | 0.086 | 0.069 | 0.045 |
| | sample E | 0.093 | 0.138 | 0.089 | 0.085 | 0.070 | 0.045 |
| | sample F | 0.096 | 0.137 | 0.089 | 0.084 | 0.071 | 0.044 |
| | sample G | 0.101 | 0.133 | 0.091 | 0.082 | 0.074 | 0.042 |
| | sample A | 0.106 | 0.128 | 0.095 | 0.078 | 0.077 | 0.040 |
| | sample H | 0.109 | 0.117 | 0.098 | 0.071 | 0.078 | 0.037 |
| | sample I | 0.111 | 0.115 | 0.100 | 0.069 | 0.079 | 0.035 |
| comparative products | brass product | 0.092 | 0.139 | 0.088 | 0.085 | 0.070 | 0.044 |

Similar results were also obtained when the glass fibers are replaced with wollastonite fibers (with an average fiber length of 8 μm).

Table 2 shows the results of the investigation on the appropriate content of the calcined petroleum coke. Samples A, and D to I each correspond to the friction material for the synchronizer ring according to the invention and each uses a calcined petroleum coke with an ash content of 0.15 mass %. The content of the calcined petroleum coke is higher in the order of Samples D, E, F, G, A, H, and I. The numerical values on Sample A and the conventional brass synchronizer ring for comparison are the same as those in Table 1.

The results in Table 2 indicate that as the content of the calcined coke increases, the resulting synchronization performance becomes better (the coefficient of dynamic friction and the synchronization time becomes higher and shorter, respectively) under each pressing force. This suggests that the content of the calcined petroleum coke should preferably be as high as possible for high synchronization performance of the resulting friction material for the synchronizer ring. The test result shows that not more than 25 mass % of the calcined petroleum coke content provides a similar level of synchronization performance (coefficient of dynamic friction and synchronization time) to that of the conventional brass synchronizer ring. Thus, it is determined that the friction material for the synchronizer ring according to the invention should preferably contain 30 mass % or more of the calcined petroleum coke.

Table 3 shows the results of a synchronization unit durability test, which is performed as follows. In a synchronization unit test machine, the inertial weight is set at 85 kgf·cm², and each synchronizer ring 10 is placed in a transmission oil (oil kind: Honda MTF-II) at 80° C. and undergoes 1000 cycles of pressing by an air cylinder at a pressing force of 25 kgf against a tapered counterpart member (name: gear cone, material: SCM420, heat treatment: carburizing, quenching and tempering, cone face: processed by grinding) rotating at a rotational speed of 4000 rpm. Thereafter, each synchronizer ring 10 undergoes up to 10000 cycles of pressing by the air cylinder against the counterpart member at a pressing force of 50 kgf, when measurements are taken of the generation cycle of gear chatter (the event of the generation of a loud sound at the time when the synchronization performance of the synchronizer ring is damaged so that the synchronization action is not well established during pressing) and taken of an abrasion wear (the length by which the friction material layer 12 of each synchronizer ring 10 is worn in the axial direction). All the annular structures 11 used in the test are made of the same base material of brass and are the same in shape and size. All the synchronizer rings 10 are manufactured by the above process, and all the friction material layers 12 have the same surface form of the friction material layer as shown in FIG. 1.

TABLE 3

| | | material content (% by mass) | | | | | synchronization unit performance test | | |
|---|---|---|---|---|---|---|---|---|---|
| | | calcined petroleum coke ash content of 0.15% by mass particle diameter of 0.1 to 0.5 mm | foundry coke ash content of 7.5% by mass ← | novolac type phenolic resin *thermosetting resin | glass fibers *inorganic fibers 74 μm in average fiber length and 16 μm in average fiber diameter | Graphite *artificial graphite 250 μm in average particle diameter | generation cycle of gear chatter | abrasion wear | attack ability on counterpart |
| inventive products | sample A | 55 | | 15 | 25 | 5 | 10000th cycle OK | about 0.05 mm | low |
| | sample B | | 55 | 15 | 25 | 5 | 10000th cycle OK | about 0.1 mm | low |

TABLE 3-continued

| | | calcined petroleum coke ash content of 0.15% by mass particle diameter of 0.1 to 0.5 mm | foundry coke ash content of 7.5% by mass ← | novolac type phenolic resin *thermosetting resin | glass fibers *inorganic fibers 74 μm in average fiber length and 16 μm in average fiber diameter | Graphite *artificial graphite 250 μm in average particle diameter | synchronization unit performance test | | |
|---|---|---|---|---|---|---|---|---|---|
| | | | | | | | generation cycle of gear chatter | abrasion wear | attack ability on counterpart |
| | sample G | 45 | 15 | 30 | 10 | 10000th cycle OK | about 0.03 mm | low | |
| | sample H | 65 | 10 | 20 | 5 | 10000th cycle OK | about 0.15 mm | low | |
| | sample I | 75 | 10 | 10 | 5 | 10000th cycle OK | about 0.2 mm | low | |
| comparative products | brass product | conventional brass synchronizer ring | | | | | chatter generated at about 1000th cycle | about 0.3 mm (the brass material causes seizing) | low |

Similar results were also obtained when the above glass fibers are replaced with wollastonite fibers (with an average fiber length of 8 μm).

Table 3 indicates that the synchronization unit durability test is done under severe conditions unendurable for the conventional brass synchronizer ring.

Samples A, B, G, H, and I each correspond to the friction material for the synchronizer ring according to the invention, and all produce satisfactory results in the synchronization unit durability test. Thus, it is found that the friction material for the synchronizer ring according to the invention has not only a high synchronization performance but also a high resistance to abrasion or seizing.

In contrast, the conventional brass synchronizer ring generates gear chatter and produces a relatively large abrasion wear. The conventional brass synchronizer ring also shows a short generation cycle of gear chatter, and the conventional brass material is found to cause seizing to the tapered counterpart member and thus is low in resistance to seizing or heat. The inventive friction material for the synchronizer ring using the calcined petroleum or foundry coke can provide a high resistance to seizing or heat for the friction material layer.

Tables 4 and 5 show the results of a synchronization unit performance test using a synchronization unit machine having a different specification from those shown in Tables 1 and 2. The results of a synchronization unit performance test shown in Table 4 are the average coefficient of dynamic friction at the stable stage obtained by 500 cycles of repeated pressing of each synchronizer ring 10 at a pressing force of 500 N against a tapered counterpart member (name: gear cone; material: SCM420; heat treatment: carburizing, quenching and tempering; tapered face: processed by grinding) rotating at a rotational speed of 2000 rpm for lapping, under the condition of 0.015 kgf·m² inertial weight in a transmission oil (oil kind: Honda MTF-II) of 80° C. placed in an oil hydraulic cylinder of a synchronization unit test machine, and also the average coefficient of dynamic friction obtained thereafter by 5 cycles of repeated pressing of each synchronizer ring 10 at a pressing force of 300 N against the said counterpart member rotating at a rotational speed of 1000, 1500 or 2000 rpm under the same condition of 0.015 kgf·m² inertial weight in the same transmission oil (oil kind: Honda MTF-II) of 80° C., as well as the average coefficient of dynamic friction in the cases with a pressing force of 500 N and 1000 N obtained in the same manner.

All the annular structures 11 used in the test are made of the same base material of brass and are the same in shape and size. All the conditions for producing the synchronizer ring are the same as those described above. Further, the surface form of the friction material layers 12 are all the same as shown in FIG. 1.

TABLE 4

| | | material content (% by mass) | | | |
|---|---|---|---|---|---|
| | | calcined petroleum coke ash content of 0.15% by mass particle diameter of 0.1 to 0.5 mm | novolac type phenolic resin *thermoplastic resin | glass fiber *inorganic fibers 74 μm in average fiber length and 16 μm in average fiber diameter | graphite *artificial graphite 250 μm in average particle diameter |
| inventive products | sample J | 30 | 30 | 40 | 5 |
| | sample K | 30 | 25 | 40 | 5 |
| | sample L | 45 | 20 | 30 | 5 |

TABLE 4-continued

|  |  |  |  |  |  |
|---|---|---|---|---|---|
|  | sample M | 50 | 15 | 30 | 5 |
|  | sample N | 65 | 15 | 15 | 5 |
|  | sample O | 75 | 10 | 10 | 5 |
|  | sample P | 80 | 10 | 10 | 0 |
| comparative product | brass product | conventional brass synchronizer ring | | | |

| | | synchronizer unit performance test | | | | | | | | | | |
|---|---|---|---|---|---|---|---|---|---|---|---|---|
| | | at the time of lapping average coefficient of kinetic friction at stable stage | average coefficient of kinetic friction after lapping rotation (rpm) | | | | | | | | attack ability on counterpart | abrasion state of friction material |
| | | | 1000 | | | 1500 | | | 2000 | | | |
| | | | pressing force (N) | | | | | | | | | |
| | | | 300 | 500 | 1000 | 300 | 500 | 1000 | 300 | 500 | 1000 | | |
| inventive products | sample J | 0.130 | 0.128 | 0.130 | 0.128 | 0.127 | 0.130 | 0.127 | 0.125 | 0.128 | 0.125 | almost none | none |
| | sample K | 0.129 | 0.135 | 0.134 | 0.131 | 0.131 | 0.132 | 0.128 | 0.128 | 0.129 | 0.126 | almost none | none |
| | sample L | 0.132 | 0.133 | 0.135 | 0.130 | 0.131 | 0.133 | 0.128 | 0.127 | 0.129 | 0.125 | none | none |
| | sample M | 0.136 | 0.137 | 0.138 | 0.135 | 0.136 | 0.138 | 0.135 | 0.137 | 0.135 | 0.134 | none | none |
| | sample N | 0.138 | 0.138 | 0.139 | 0.138 | 0.139 | 0.140 | 0.137 | 0.139 | 0.138 | 0.135 | none | none |
| | sample O | 0.137 | 0.142 | 0.141 | 0.137 | 0.141 | 0.140 | 0.136 | 0.139 | 0.137 | 0.133 | none | almost none |
| | sample P | 0.134 | 0.135 | 0.137 | 0.135 | 0.133 | 0.135 | 0.133 | 0.131 | 0.133 | 0.131 | none | almost none |
| comparative product | brass product | 0.113 | 0.122 | 0.120 | 0.117 | 0.120 | 0.117 | 0.114 | 0.118 | 0.114 | 0.111 | almost none | a little abrasion |

Similar results were also obtained when the above glass fibers are replaced with wollastonite fibers (with an average fiber length of 8 μm).

Table 4 shows the results of the investigation on the appropriate content of the calcined petroleum coke. Samples J, L, M, N, O, and P each correspond to the friction material for the synchronizer ring according to the present invention, and each uses a calcined petroleum coke with an ash content of 0.15 mass %. The content of the calcined petroleum coke is increased in the order of Samples J=K<L<M<N<O<P. The results of the conventional brass synchronizer ring are shown for comparison.

As shown in Table 4, there was a tendency that as the content of the calcined petroleum coke increases under each pressing force, the coefficient of dynamic friction of the present friction material becomes higher compared to the conventional brass synchronizer ring. In order to obtain higher coefficient of dynamic friction, it is considered that the content of calcined petroleum coke should be preferably set at 50 mass % to 75 mass % by adjusting the content of other materials. This suggests that the content of the calcined petroleum coke should preferably be as high as possible for high synchronization performance of the resulting friction material for the synchronizer ring and, taking the content of other materials into consideration, it can be determined that the content of the calcined petroleum coke in the friction material for the synchronizer ring should be preferably 30 mass % to 80 mass %, more preferably 50 mass % to 75 mass %.

TABLE 5

| | | material content (% by mass) | | | | | |
|---|---|---|---|---|---|---|---|
| | | calcined petroleum coke ash content of 0.15% by mass | | | | glass fiber *inorganic fibers 74 μm in average fiber length and 16 μm in average fiber diameter | graphite *artificial graphite 250 μm in average particle diameter |
| | | particle diameter of 0.1 to 0.5 (mm) | particle diameter of not more than 0.1 (mm) | particle diameter of 0.5 to 1 (mm) | novolac type phenolic resin *thermoplastic resin | | |
| inventive products | sample M | 50 | 0 | 0 | 15 | 30 | 5 |
| | sample Q | 0 | 50 | 0 | 15 | 30 | 5 |
| | sample R | 0 | 0 | 50 | 15 | 30 | 5 |

TABLE 5-continued

| | | at the time of lapping average coefficient of kinetic friction at stable stage | average coefficient of kinetic friction after lapping rotation (rpm) | | | | | | | | | attack ability on counterpart | abrasion state of friction material |
|---|---|---|---|---|---|---|---|---|---|---|---|---|---|
| | | | 1000 | | | 1500 | | | 2000 | | | | |
| | | | pressing force (N) | | | | | | | | | | |
| | | | 300 | 500 | 1000 | 300 | 500 | 1000 | 300 | 500 | 1000 | | |
| inventive products | sample M | 0.136 | 0.137 | 0.138 | 0.135 | 0.136 | 0.138 | 0.135 | 0.137 | 0.135 | 0.13 | none | none |
| | sample Q | 0.132 | 0.133 | 0.132 | 0.132 | 0.132 | 0.132 | 0.130 | 0.133 | 0.131 | 0.130 | none | almost none |
| | sample R | 0.135 | 0.136 | 0.137 | 0.135 | 0.136 | 0.138 | 0.136 | 0.137 | 0.136 | 0.134 | none | partial chip occurred |

Similar results were also obtained when the above glass fibers are replaced with wollastonite fibers (with an average fiber length of 8 μm).

Table 5 shows the results of investigation on the preferable particle size of calcined petroleum coke to be contained in a friction material for the synchronizer ring. Samples M and Q, R are a friction material for the synchronizer ring of the present invention, and all these materials use calcined petroleum coke with an ash content of 0.15 mass %, and have the same mixing ratio. Moreover, all the combination materials to be mixed have the same feature, and the combination ratio is also the same. The calcined petroleum coke to be contained in Sample M has a particle diameter of 0.1 to 0.5 mm obtained through classification using a standard sieve. The calcined petroleum coke to be contained in Sample Q has a particle diameter of not more than 0.1 mm obtained through classification with a standard sieve. The calcined petroleum coke to be contained in Sample R has a particle diameter of 0.5 to 1 mm obtained through classification using a standard sieve.

Table 5 indicates that a relatively higher coefficient of dynamic friction in Sample M was obtained than in Samples Q, R. These results suggest that porosity state of the friction surface and rigidity of the friction material were well-balanced. Based on these results, it is preferably determined that the calcined petroleum coke to be contained in the friction material having a particle diameter within the range of 0.1 to 0.5 mm should be selected as much as possible for synchronizer rings having a good synchronization performance.

INDUSTRIAL APPLICABILITY

According to the present invention, the friction material for use in the synchronizer ring comprises (A) a petroleum coke with an ash content of 0.1 mass % to 8 mass % or (B) a pitch coke with an ash content of 0.1 mass % to 8 mass %, more preferably (C) a calcined petroleum coke with an ash content of 0.1 mass % to 1 mass % or (D) a foundry coke with an ash content of 5 mass % to 8 mass %. Such friction material can form a synchronizer ring with a high coefficient of dynamic friction and good resistance to abrasion and seizing. Such a material can also suppress damage to the sliding surface of the gear cone (counterpart member).

Figure 1:
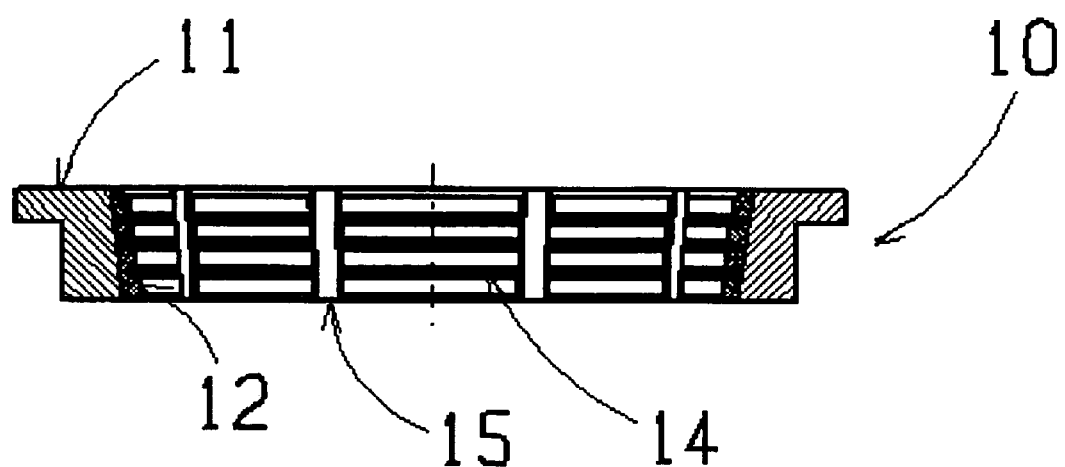
FIG. 1 is an axial sectional view showing the main body of a synchronizer ring having a layer of a friction material for the synchronizer ring according to the present invention on the inner surface of its annular structure.
Figure 2:
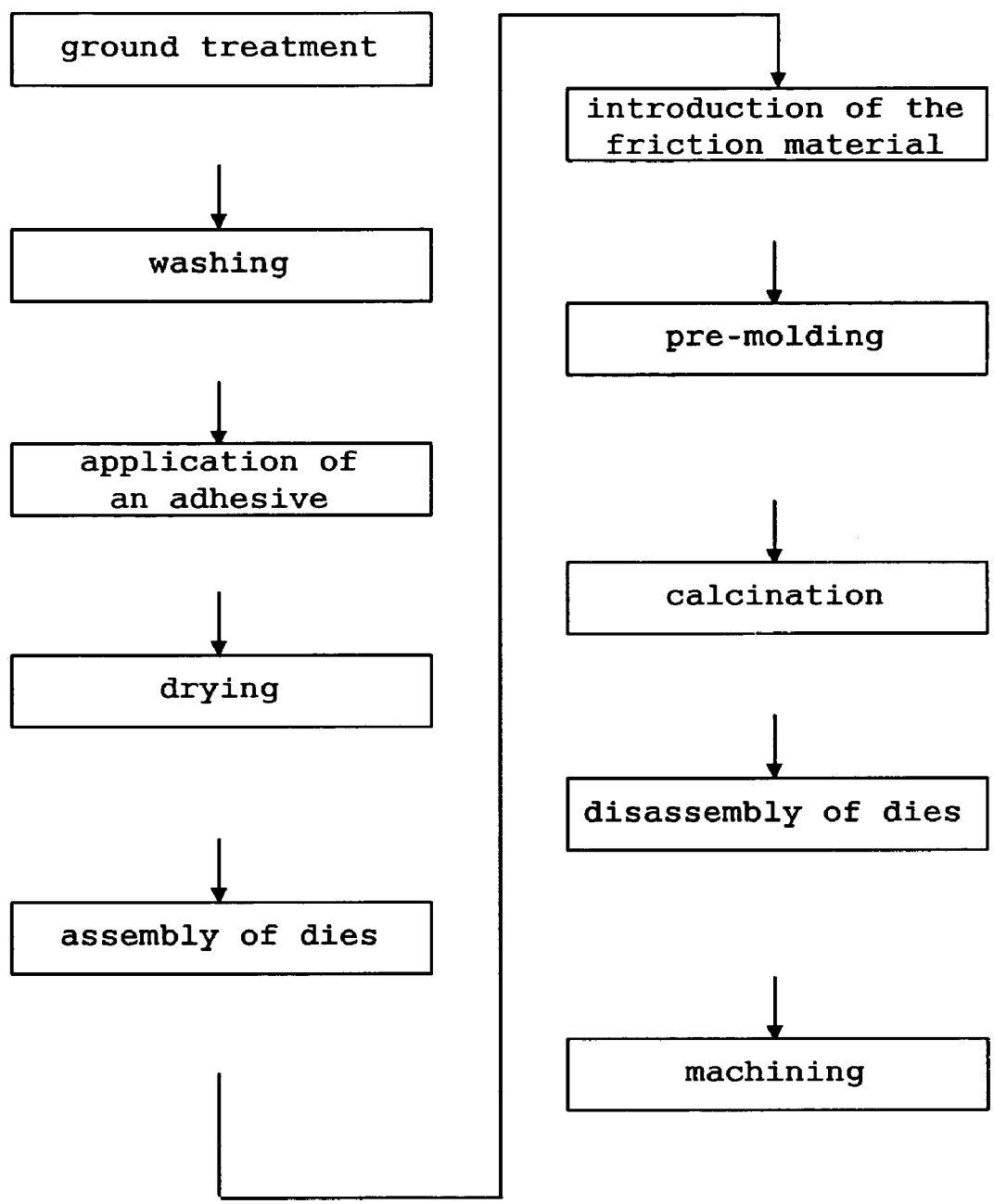
FIG. 2 is a flowchart showing a process of forming, on the inner surface of the annular structure, a friction material layer from a friction material for the synchronizer ring according to the present invention.
Figure 3:
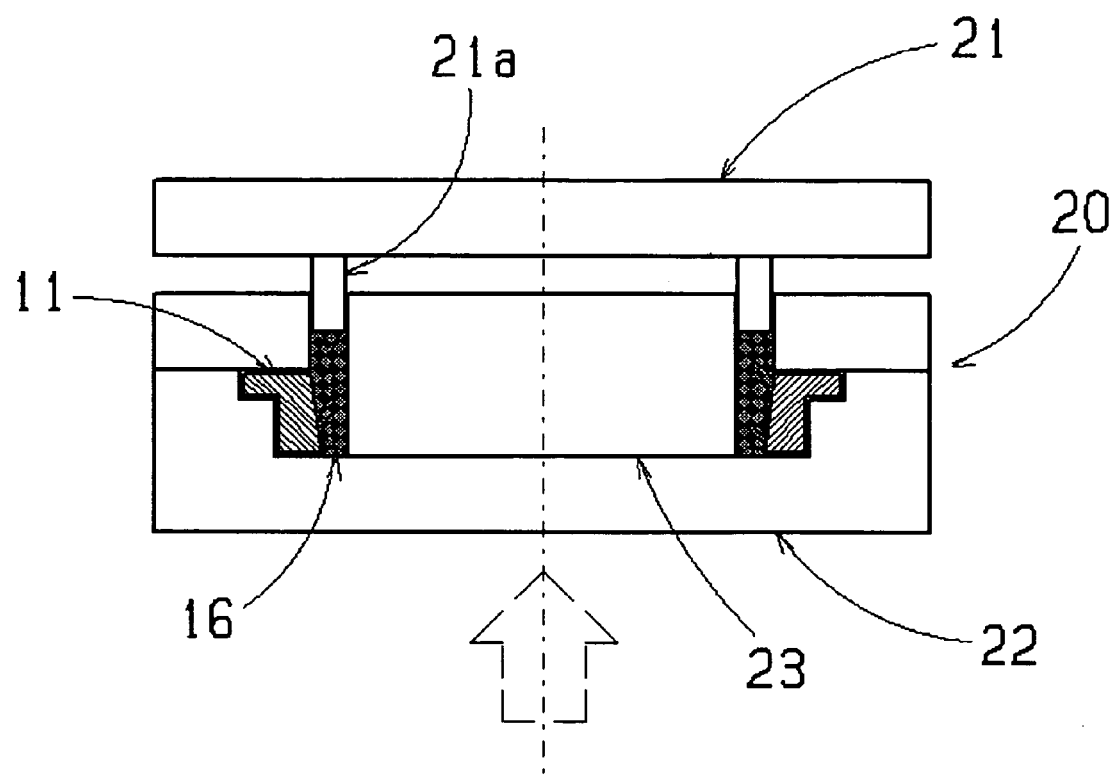
FIG. 3 is a schematic diagram showing a process of pre-molding a friction material for the synchronizer ring on the inner surface of the annular structure after the introduction of the friction material.
Figure 4:
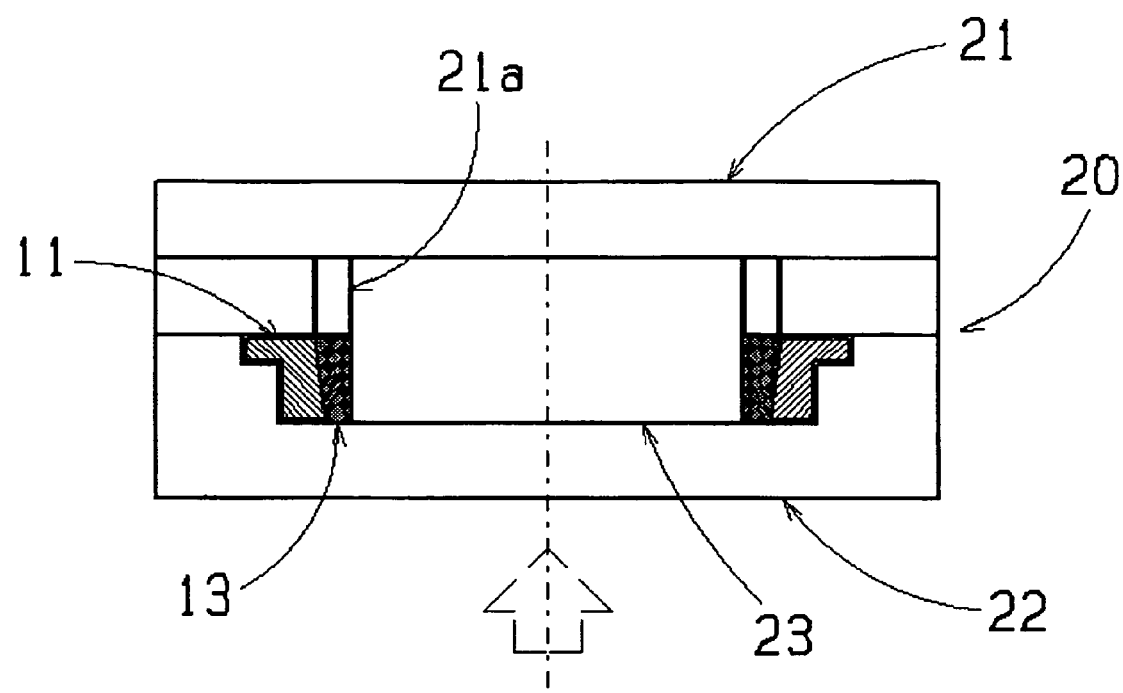
FIG. 4 is a schematic diagram showing a calcination process for forming a friction material layer integrated with the inner surface of the annular structure after the pre-molding.

DESCRIPTION OF THE SYMBOLS 10. synchronizer ring
11. annular structure
12. friction material layer
13. friction material layer
14. annular streak groove
15. vertical groove
16. friction material
20. molding die
21. upper die
21a. punch
22. lower die
23. core

The invention claimed is:

1. A friction material for a synchronizer ring, comprising 30 mass % to 80 mass % of a calcined petroleum coke with an ash content of 0.1 mass % to 1 mass %, based on the whole friction materials for the synchronizer ring,
   wherein not less than 50 mass % of the particles charge of the calcined petroleum coke have a particle diameter of 0.1 to 0.5 mm.

2. The friction material for a synchronizer ring according to claim 1, comprising 50 mass % to 75 mass % of the calcined petroleum coke, based on the whole friction materials for the synchronizer ring.

3. The friction material for a synchronizer ring according to claim 1, further comprising 10 mass % to 30 mass % of a thermosetting resin, 5 mass % to 40 mass % of inorganic fibers and/or inorganic particles.

4. The friction material for a synchronizer ring according to claim 1, further comprising not more than 5 mass % of graphite.

5. The friction material for a synchronizer ring according to claim 1, further comprising not more than 10 mass % of metal fibers and/or not more than 10 mass % of metal particles.

6. The friction material for a synchronizer ring according to claim 1, wherein the thermosetting resin is a novolac type phenolic resin.

7. A friction material for a synchronizer ring, comprising 30 mass % to 80 mass % of a calcined petroleum coke with an ash content of 0.1 mass % to 1 mass %, based on the whole materials; 10 mass % to 30 mass % of a thermosetting resin; 5 mass % to 40 mass % of inorganic fibers and/or inorganic particles; and not more than 5 mass % of graphite, wherein not less than 50 mass % of the particles of the calcined petroleum coke have a particle diameter of 0.1 to 0.5 mm.

8. A wet friction material, comprising 30 mass % to 80 mass % of a calcined petroleum coke with an ash content of 0.1 mass % to 1 mass %, based on the whole materials; 10 mass % to 30 mass % of a thermosetting resin; 5 mass % to 40 mass % of inorganic fibers and/or inorganic particles; and not more than 5 mass % of graphite, wherein not less than 50 mass % of the particles of the calcined petroleum coke have a particle diameter of 0.1 to 0.5 mm.

9. A synchronizer ring, comprising the friction material according to claim 1.

10. A synchronizer ring, comprising the friction material according to claim 7.

11. A synchronizer ring, comprising the wet friction material according to claim 8.

* * * * *